(12) United States Patent
Salvarani et al.

(10) Patent No.: US 8,979,696 B2
(45) Date of Patent: Mar. 17, 2015

(54) HIGH-PRESSURE HOMOGENIZER WITH AN EPICYCLIC REDUCTION GEAR UNIT

(75) Inventors: Luca Salvarani, Parma (IT); Massimiliano Benassi, Fornovo Taro (IT); Michele Madureri, Parma (IT)

(73) Assignee: Gea Mechnical Equipment Italia S.p.A., Parma (IT)

( * ) Notice: Subject to any disclaimer, the term of this patent is extended or adjusted under 35 U.S.C. 154(b) by 409 days.

(21) Appl. No.: 13/395,002

(22) PCT Filed: Jun. 30, 2010

(86) PCT No.: PCT/IB2010/052984
§ 371 (c)(1), (2), (4) Date: Mar. 8, 2012

(87) PCT Pub. No.: WO2011/030237
PCT Pub. Date: Mar. 17, 2011

(65) Prior Publication Data
US 2012/0172166 A1    Jul. 5, 2012

(30) Foreign Application Priority Data

Sep. 10, 2009    (IT) .............................. PR2009A0066

(51) Int. Cl.
| F16H 37/02 | (2006.01) |
| F16H 57/04 | (2010.01) |
| F16H 57/08 | (2006.01) |
| F04B 17/03 | (2006.01) |
| F04B 9/02  | (2006.01) |

(Continued)

(52) U.S. Cl.
CPC . *F04B 17/03* (2013.01); *F04B 9/02* (2013.01); *F04B 53/16* (2013.01); *F16H 1/28* (2013.01)

USPC .......... 475/159; 475/161; 474/137; 184/6.12; 184/11.5

(58) Field of Classification Search
CPC ............ F16H 57/0482; F16H 57/0479; F16H 57/0486; F16H 9/26; F16H 55/36; A21C 1/1465; A21C 1/147; F04B 7/0034; F04B 7/0258; F16F 57/0025; F16F 57/0434
USPC .................................................. 475/159, 161
See application file for complete search history.

(56) References Cited

U.S. PATENT DOCUMENTS

| 2,146,687 A | * | 2/1939 | Regan ........................... 475/329 |
| 2,326,329 A |   | 8/1943 | Camp |
| 2,795,155 A |   | 6/1957 | Bade |

(Continued)

FOREIGN PATENT DOCUMENTS

| GB | 2 079 383 A   | 1/1982  |
| IT | PR99A000045 A | 11/2000 |

(Continued)

*Primary Examiner* — David D Le
*Assistant Examiner* — Colby M Hansen
(74) *Attorney, Agent, or Firm* — Pearne & Gordon LLP

(57) ABSTRACT

A high-pressure homogenizer including:
- a fixed body (7) housing a rotating crankshaft (10);
- a motor (3) for driving the crankshaft (10);
- a reduction gear unit (4) interconnected between the crankshaft and transmission elements (5, 6), characterized in that the reduction gear unit (4) is an epicyclic reduction gear unit. Preferably there is provided a lubricant feed line (15) which passes through the fixed body and reaches the epicyclic reduction gear unit (4). Preferably the epicyclic reduction gear unit (4) is constructed integrally with the fixed body (4).

6 Claims, 10 Drawing Sheets

(51) Int. Cl.
  *F04B 53/16* (2006.01)
  *F16H 1/28* (2006.01)

(56) References Cited

U.S. PATENT DOCUMENTS 6,039,667 A  3/2000  Schunck et al.
8,517,889 B2 *  8/2013  Misala .......................... 475/322
2008/0182699 A1  7/2008  Salvaire et al.

FOREIGN PATENT DOCUMENTS

| WO | 99/47811 A1 | 9/1999 |
| WO | 2008/010490 A1 | 1/2008 |
| WO | 2008/044253 A1 | 4/2008 |

* cited by examiner

FIG. N° 9

HIGH-PRESSURE HOMOGENIZER WITH AN EPICYCLIC REDUCTION GEAR UNIT

TECHNICAL FIELD AND BACKGROUND ART

The present invention relates to a high-pressure homogenizer with an epicyclic reduction gear unit.

In the treatment of high-pressure fluids (approximately from 150 to 1500 bar), in particular with regard to emulsion micronization applications, stabilization of dispersions and the controlled cellular rupture/break-up of a fluid, apparatuses called homogenizers are frequently used. Said apparatuses generally comprise a pump with pistons that move with alternating motion by means of a crankshaft (mounted on a fixed pump body), are synchronous and mutually offset by an angle of 360°/n, where n is the number of pumping pistons that move and compress the fluid inside the process part of the machine.

In particular, PR99A000045 discloses a homogenizer comprising an adjustable valve (called homogenizing valve), which achieves the forced passage of the fluid to be treated from a high pressure area to a low pressure area, and a transmission apparatus, in turn comprising a high pressure piston pump, an electric motor which drives the pump and a reduction gear unit connected between the motor and pump. Said reduction gear unit is necessary to reduce the rotation speed of the motor (generally about 1500/1800 revolutions per minute) to a speed that is useful for the operation of the pump (about 150/180 revolutions per minute for the crankshaft with pistons). Typically, the reduction gear unit is of the type with parallel axes and achieves a reduction ratio of about 1:5, whereas a further reduction of said rotation speed (about 1:2) is achieved by the means for transmitting motion from the motor to the reduction gear unit, which generally comprise a system of multiple belts with pulleys (large pulley on the reduction gear unit side and small pulley on the motor side).

In the known solutions, the connection between the reduction gear unit, pump and motor is achieved by means of what is called a "pendulum-like" fastening/assembly technique.

In this manner, the reduction gear unit is movable relative to the pump body, as it can rotate around the axis defined by the crankshaft.

The pendulum-like assembly of the reduction gear unit proves convenient during the assembly stage.

However, said technical solution entails some disadvantages, since it introduces undesirable stresses and oscillations into the transmission apparatus.

Such disadvantages are remedied by WO 2008/044253 of the same Applicant by means of an adaptor flange for rigidly fastening a parallel axis reduction gear unit to the fixed body housing the crankshaft so as to inhibit any oscillation of the reduction gear unit relative to the crankshaft, thus achieving a cylindrical coupling between the reduction gear unit and the fixed body, which is coaxial with the crankshaft.

However, when homogenizers of large sizes and powers (>300 kW) are constructed, if only belts or belts with parallel axis reduction gear units were to be used the overall dimensions obtained would be too large to permit transport of the machine. Furthermore, as in the parallel axis reduction gear unit the input axis is parallel to the output axis and not coaxial therewith, unwanted torques are created.

WO 99/47811 discloses a homogenizer comprising a fixed body housing a rotating crankshaft; a motor for driving the crankshaft; a reduction gear unit interconnected between the crankshaft and transmission means.

US 2008/0182699 shows a epicyclic reduction gear unit for a pump having a different use than the present homogenizer and in any case said document does not contain any teaching as to constructing the reduction gear unit integral with the pump. The same considerations also apply for U.S. Pat. No. 2,795,155.

U.S. Pat. No. 6,039,667 likewise refers to an epicyclic reduction gear unit without any external pump to which it may be associated.

GB 2079383A and WO2008/010490A1 disclose epicyclic reduction gear units of the prior art unable to achieve the results of the present invention.

In this context, the technical task at the basis of the present invention is to propose a homogenizer that overcomes the drawbacks of the above-mentioned prior art.

DISCLOSURE OF THE INVENTION

In particular, it is an object of the present invention to provide a homogenizer ensuring compactness of the reduction gear unit and of the machine in general, optimization of the load distribution, limited weight, reduced bending stress on the shaft, limited/absent axial stress and a reduction in assembly times.

A further object is to be able to have a single lubrication circuit (for the reduction gear unit and transmission means of the homogenizer) rather than two separate lubrication systems for the reduction gear unit and homogenizer.

A further object is to enable better heat dissipation for the reduction gear unit.

The defined technical task and the specified objects hereof are substantially achieved by the homogenizer of the present invention.

BRIEF DESCRIPTION OF DRAWINGS

Further characteristics and advantages of the present invention will become more apparent from the following illustrative, and hence non-limiting, description of a preferred, but not exclusive, embodiment of a homogenizer as illustrated in the appended drawings, in which.

BEST MODE FOR CARRYING OUT THE INVENTION

Figure 1:
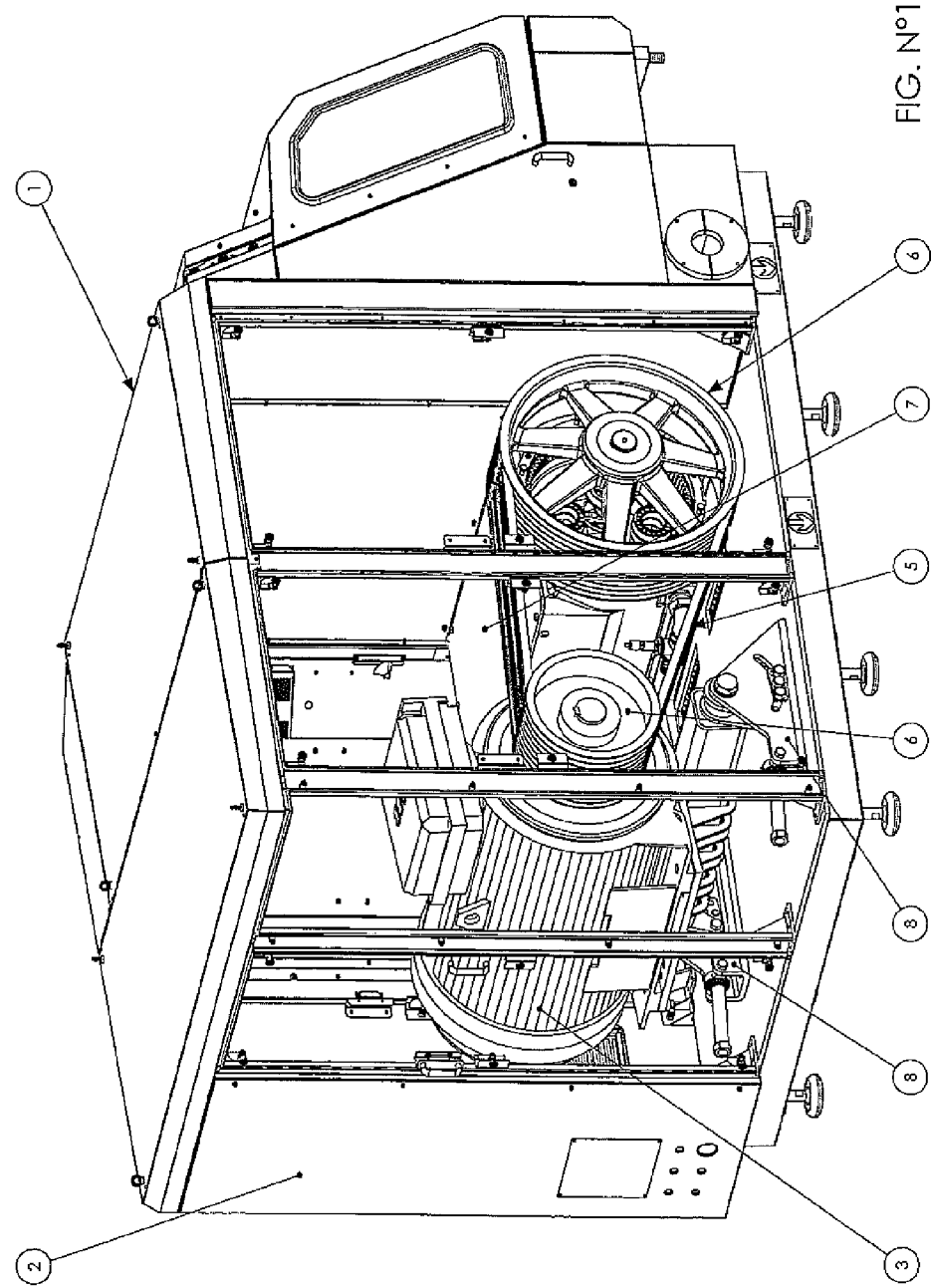
FIG. 1 illustrates an overall perspective view of the homogenizer.
Figure 2:
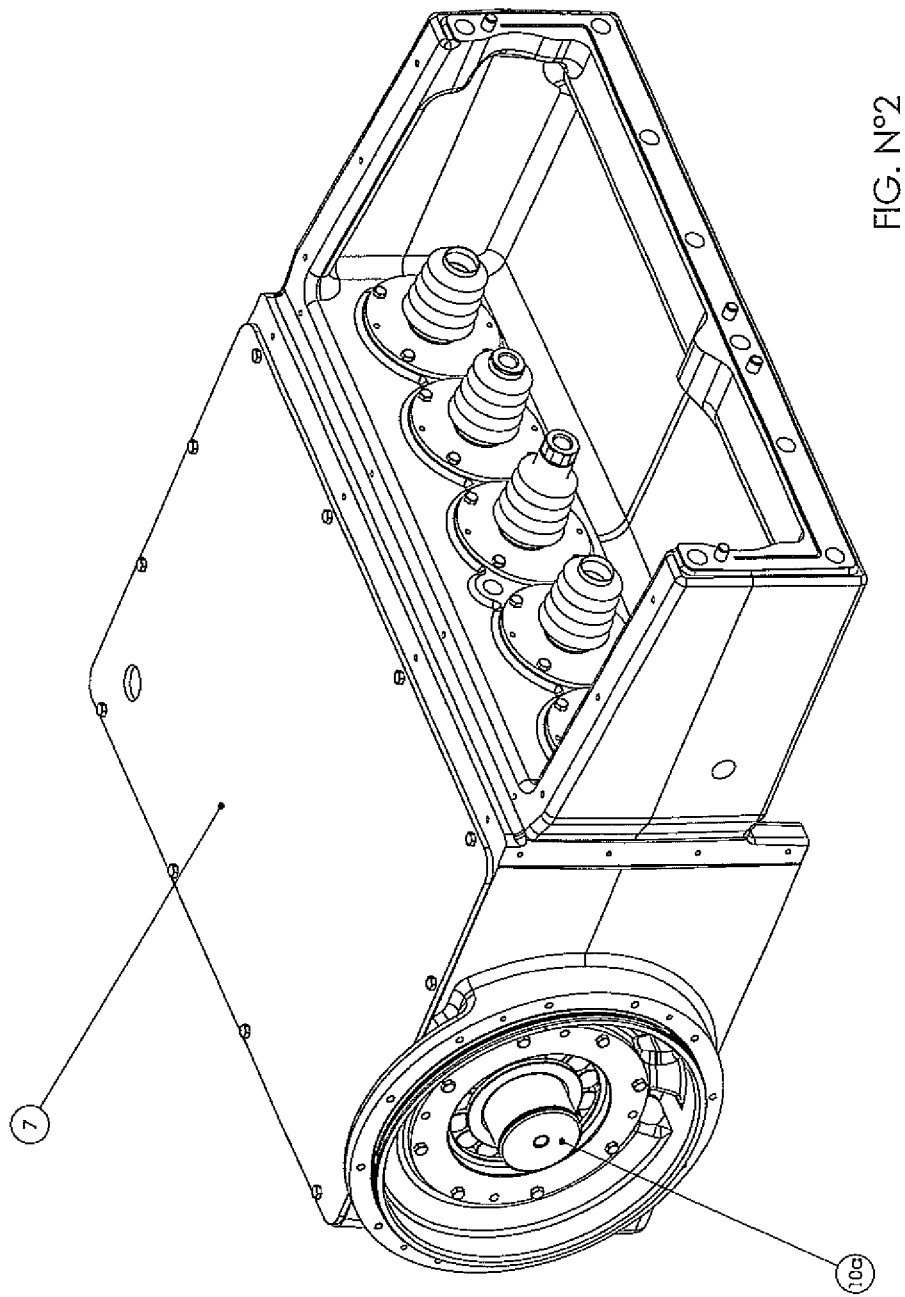
FIGS. 2, 3 and 4 illustrate the same perspective view with the pump body partially open, respectively without the reduction gear unit, with the epicyclic reduction gear unit and also with the transmission pulley.

With reference to the figures, 1 generally indicates a homogenizer having a containing and supporting frame 2 in which there is housed an electric motor 3, connected to a reduction gear unit 4 by means of a system of parallel belts 5 (shown as lines in FIG. 1) and pulleys 6 constituting transmission means.

Said reduction gear unit 4 is connected in turn to a fixed body 7. The motor 3 rests upon a pivoted device 8 (made up of a part fixed to the frame 2 and a panel that rotates relative to the fixed part) which allows the rotation of the motor 3 and thus the tensioning of the belts 5. The position of the motor 3 relative to the frame 2 is adjusted and fixed using driving means of a known type.

The fixed body 7 is solidly constructed with the frame 2 and houses a crankshaft 10, of a known type, which rotates inside said fixed body 7. The crankshaft 10 has an overhanging portion 10a which projects relative to the fixed body 7. The reduction gear unit 4 is keyed onto said portion of the crankshaft 10; therefore, the crankshaft 10 defines the low-speed shaft of the reduction gear unit, which, in the illustrated embodiment, is innovatively of an epicyclic type.

In particular, the epicyclic reduction gear unit 4 has its own sun gear 9, which in this specific case compels three planet gears 11 to rotate inside a fixed toothed ring 12. The planet gears 11 are supported by a planet gear carrier 13 which thus rotates at a slower speed than the sun gear 9.

The planet gear carrier 13 is keyed onto the portion 10a of the crankshaft (low-speed output shaft of the reduction gear unit), whereas the sun gear 9 is keyed onto a high-speed input shaft 14 solidly constrained with the pulley 6, which is driven by the motor 3 via belts 5.

The pulley 6 is innovatively configured so as to enclose the outer casing 16 of the epicyclic reduction gear unit, thus limiting the axial length and hence the projection of the crankshaft 10.

Figure 3:
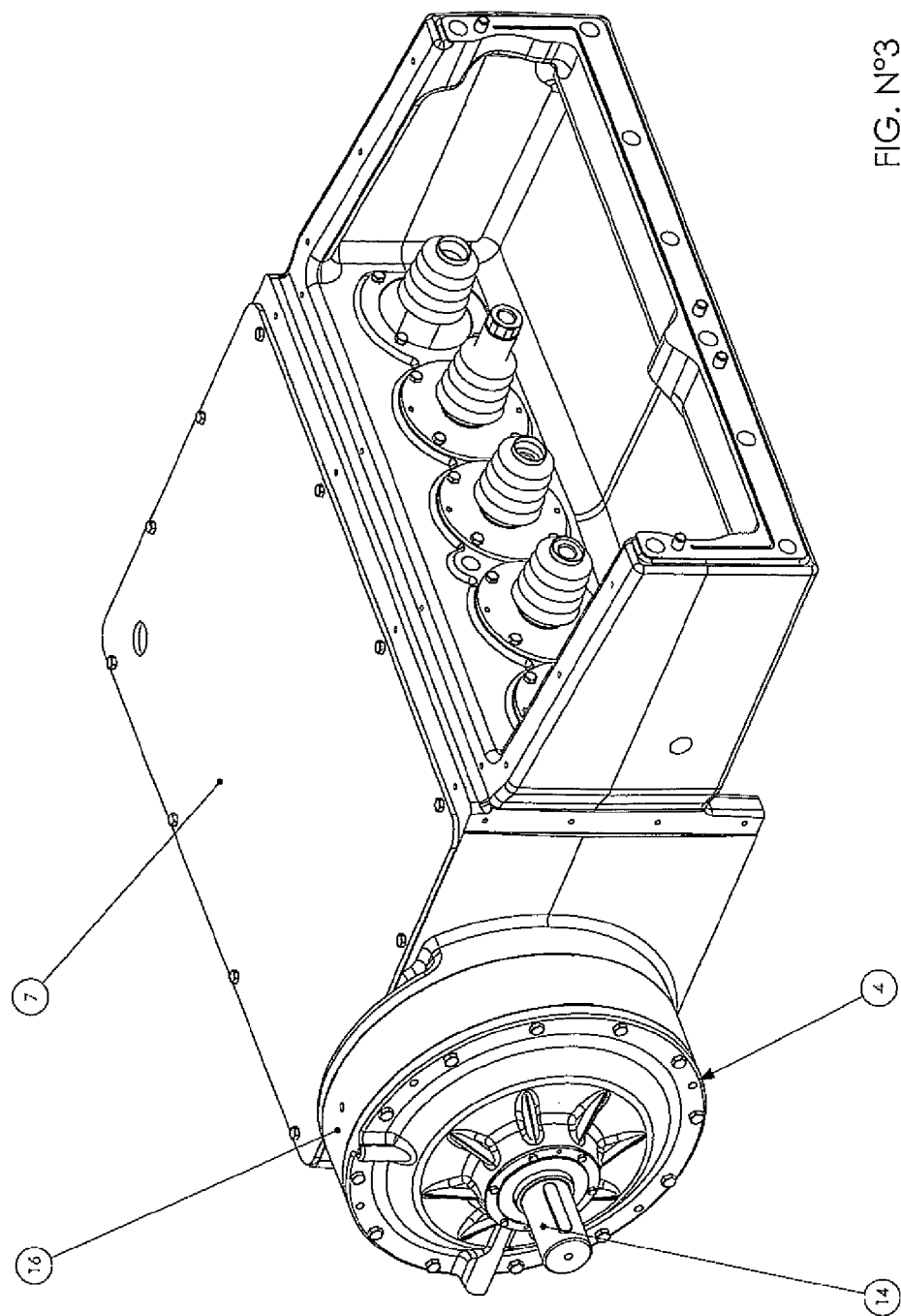
Figure 4:
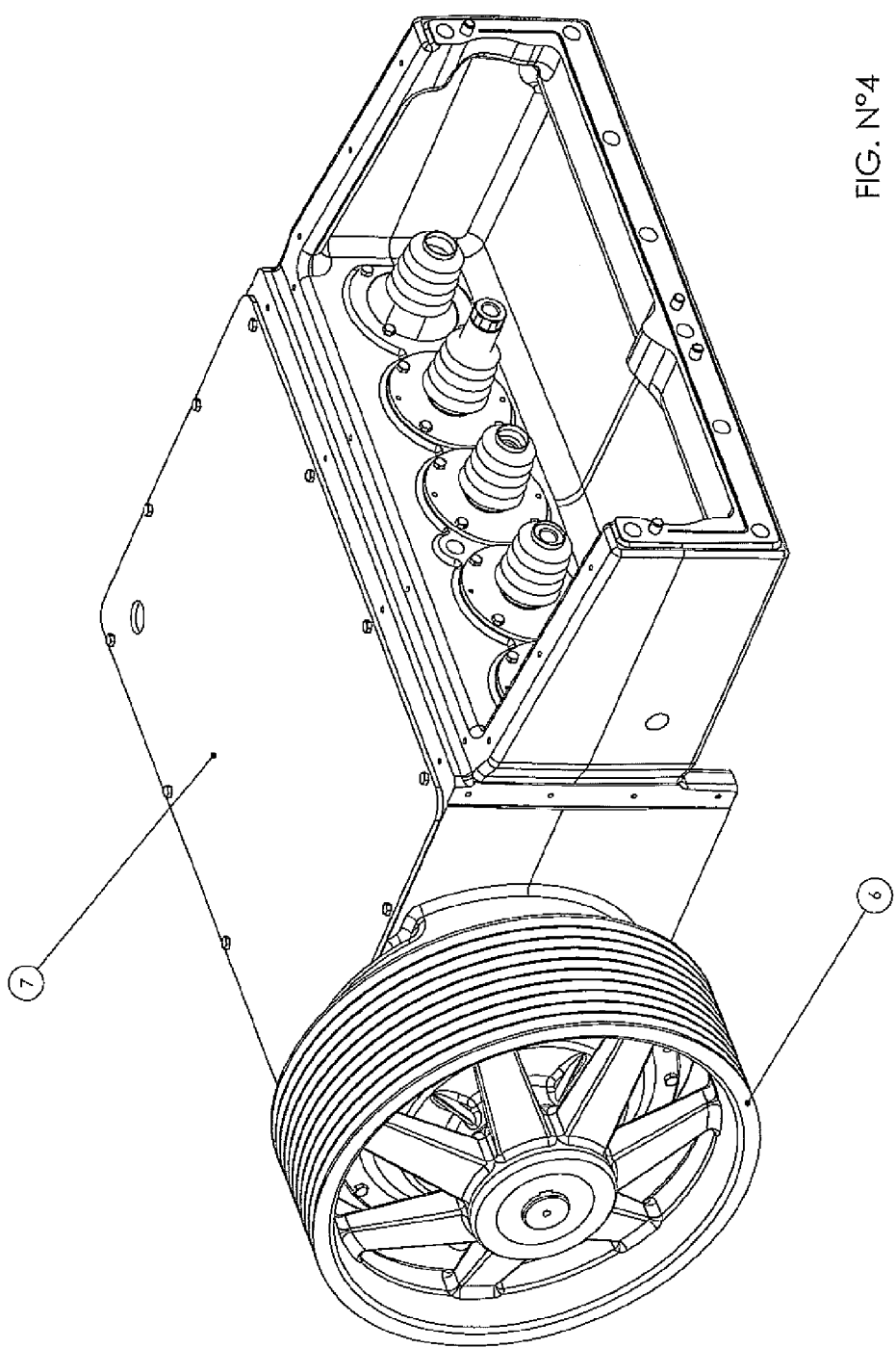
Figure 6:
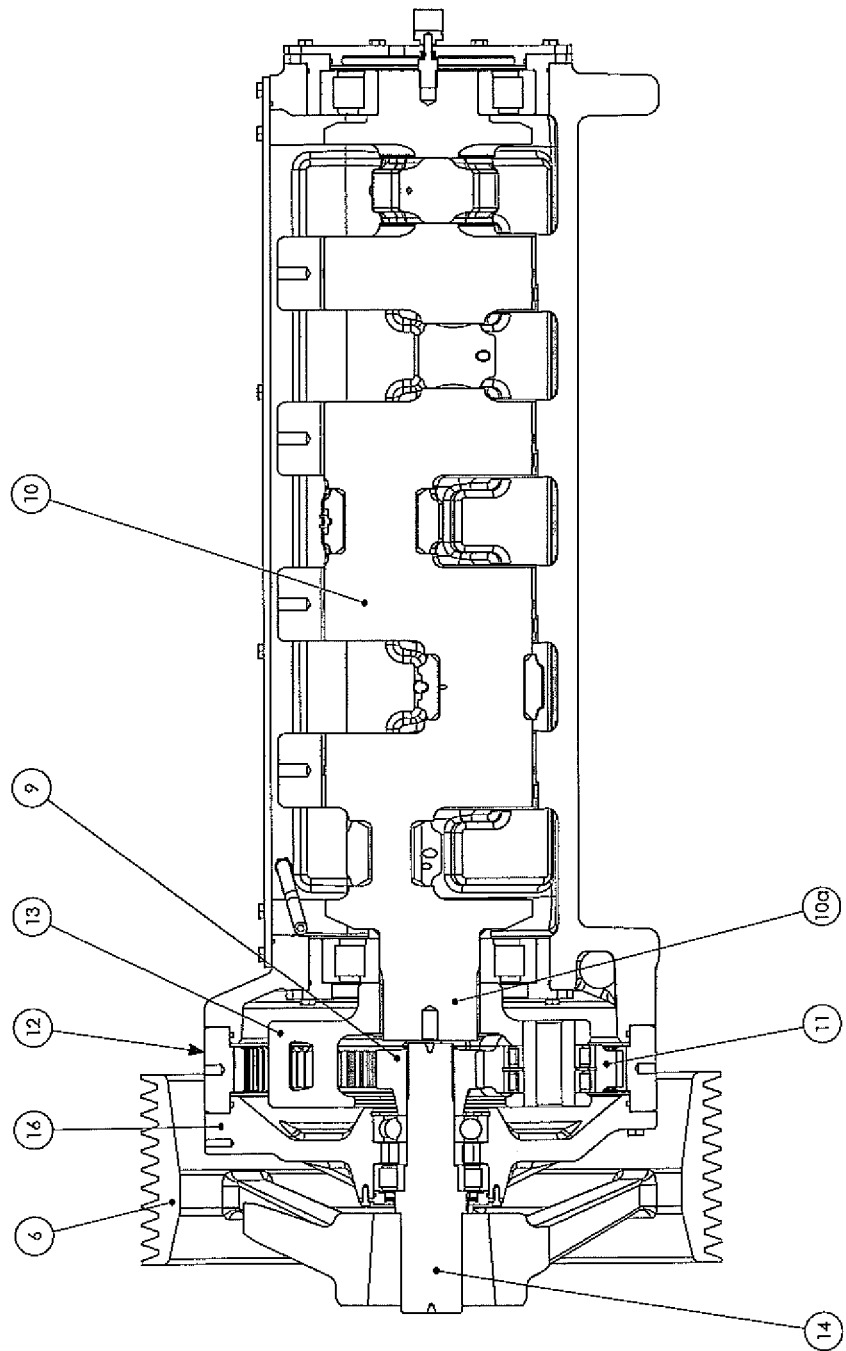
FIG. 6 illustrates a cross-section view of the pump-reduction gear unit-pulley assembly.
Figure 7:
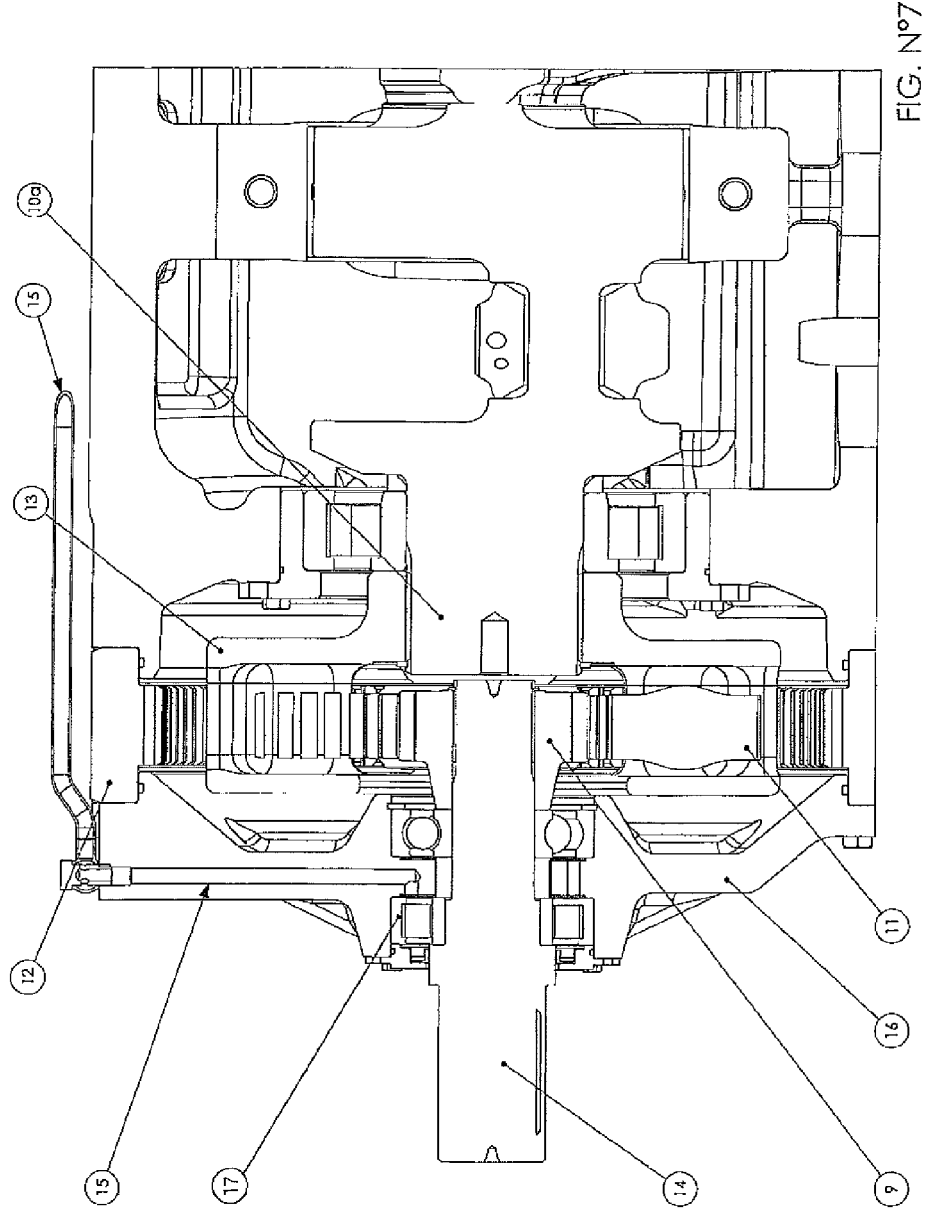
FIG. 7 illustrates a different cross-section view of a detail of the pump-reduction gear unit-pulley assembly.
Figure 8:
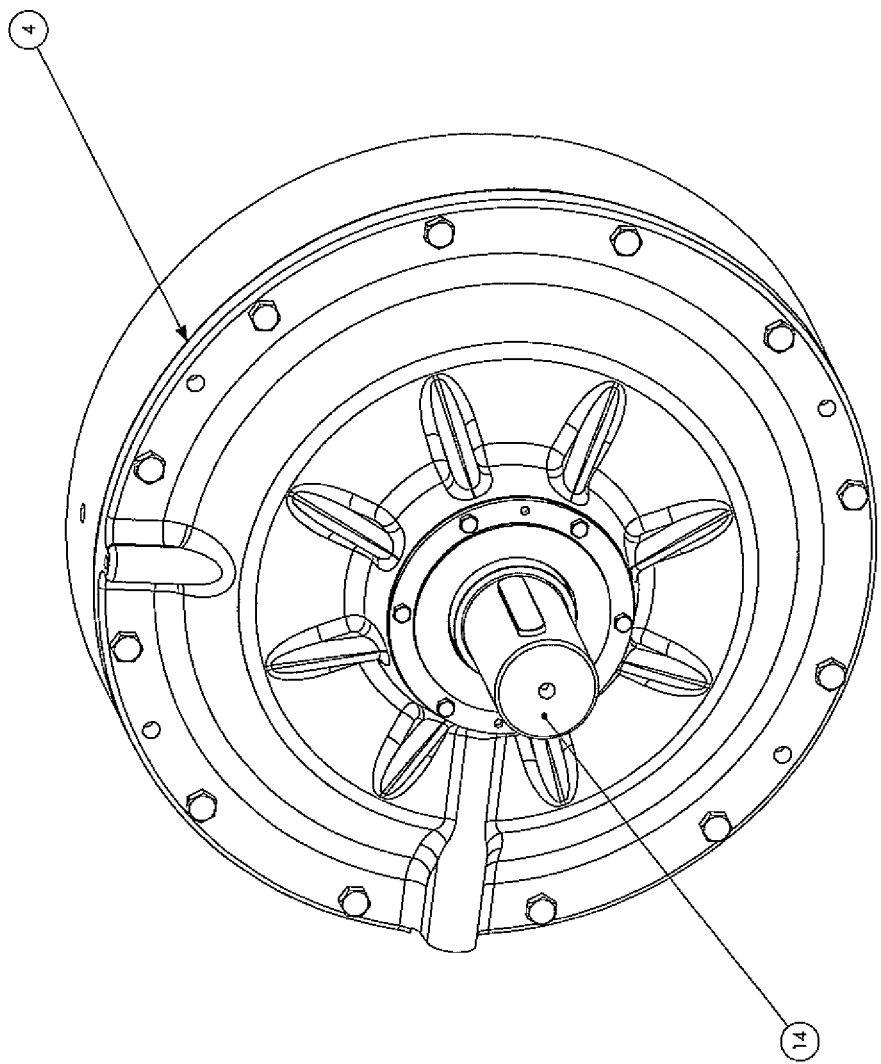
FIGS. 8, 9 and 10 illustrate different perspective views of the epicyclic reduction gear unit.
Figure 9:
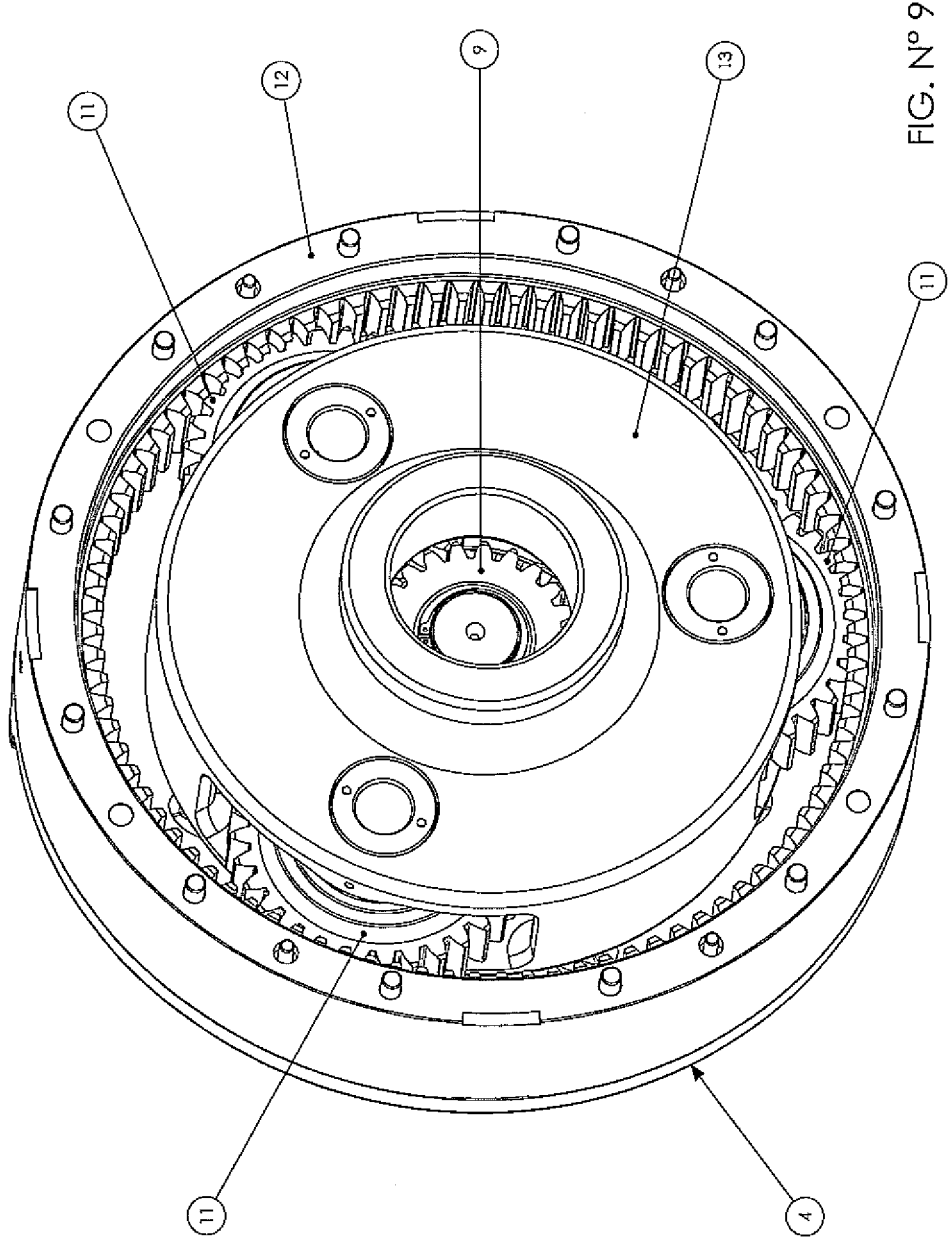

FIGS. 3, 6 and 7 show the connection between the fixed body 7 and the epicyclic reduction gear unit 4.

Figure 5:
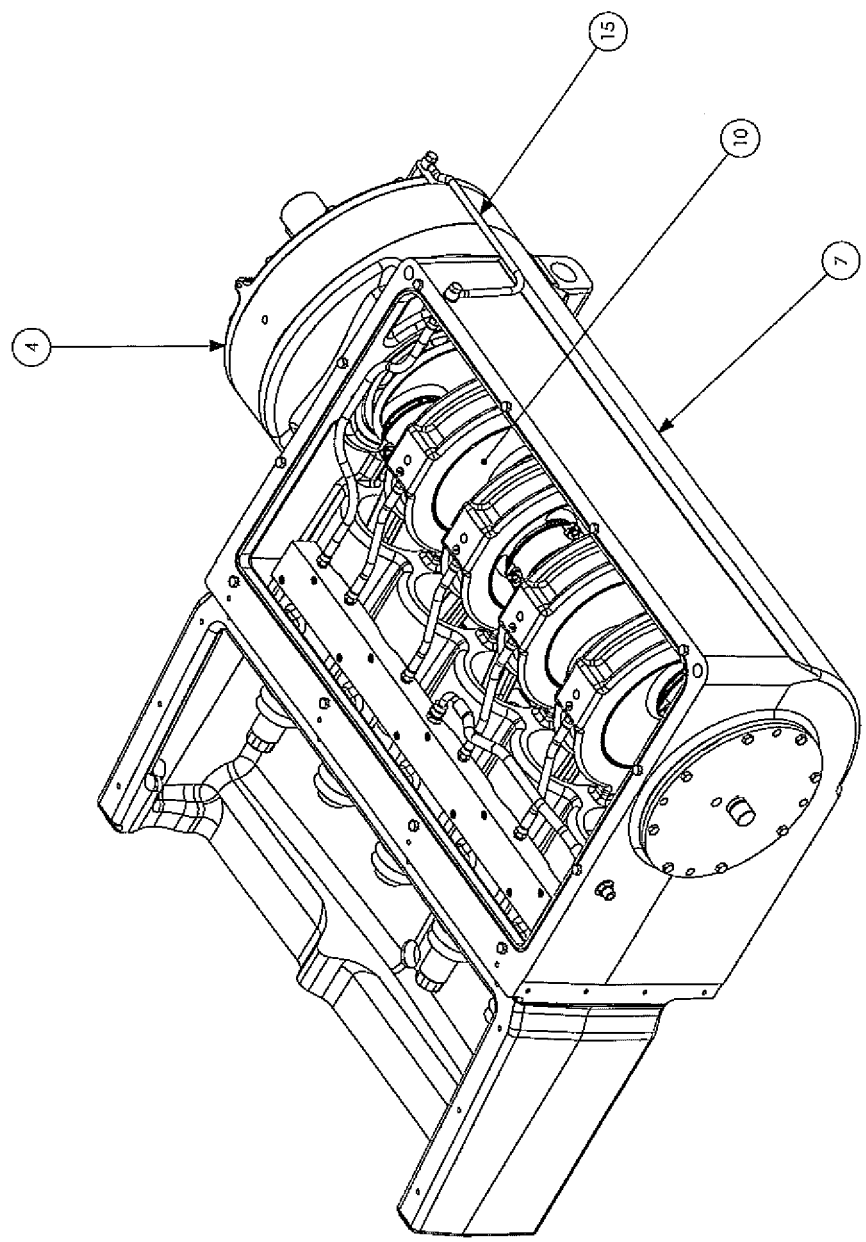
FIG. 5 illustrates a further perspective view of the pump body open.
Figure 10:
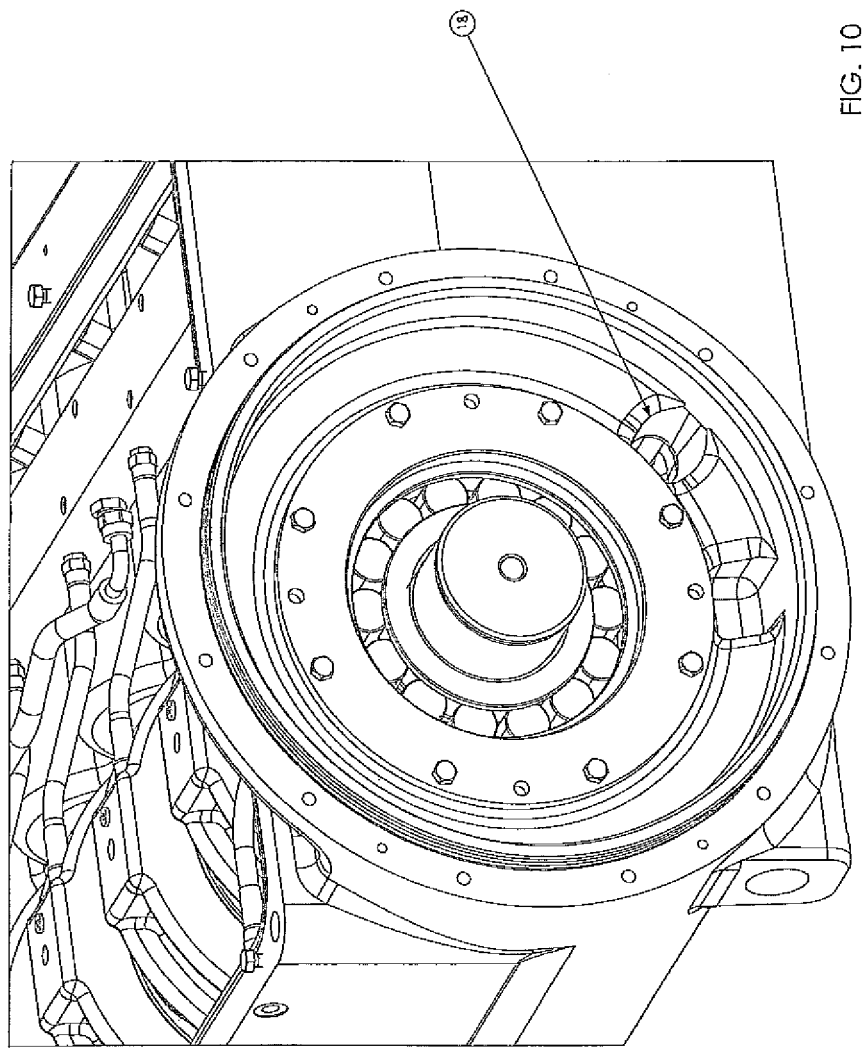

FIGS. 5, 7 and 10 show how, innovatively, the transmission chamber (in which the crankshaft 10 is housed) and the chamber of the epicyclic reduction gear unit (containing the gears of the epicyclic reduction gear unit) preferably communicate via a through hole 18 and a line 15 which allows an additional feeding of oil (or another lubricant) specific for a journal bearing 17 of the reduction gear unit, said oil being drawn from the existing lubrication system of the fixed body 7.

Essentially, a single lubrication manifold is used, from which leads the line 15 for feeding oil to the reduction gear unit, thus facilitating the distribution of oil where needed.

The line 15 is inserted into a hole in the fixed body 7 (as illustrated in FIG. 5) so as to feed oil into the roller journal bearing of the epicyclic reduction gear unit (as illustrated in FIG. 7), thus improving the lubrication thereof.

The lubricant feed line 15 may also pass through the fixed body and reach the epicyclic reduction gear unit 4.

The use of the line 15 also allows having a single type of lubrication for the fixed body 7 and reduction gear unit 4, whereas the use of parallel axis reduction gear units entails having two independent lubrication systems, one for the fixed body and one for the parallel axis reduction gear unit, which use oils or lubricants of a different type.

The use of the line 15 thus enables not only better lubrication of the reduction gear unit but also a reduced consumption of oil and a lower ecological impact.

Innovatively, the epicyclic reduction gear unit 4 is constructed integrally with the fixed transmission body 7 and this makes it possible to have a shorter drive shaft (with a grooved coupling) and thus greater compactness and reduced stresses.

The epicyclic reduction gear unit 4 constructed integrally with the fixed body 7 also enables better heat dissipation because the volume of the reduction gear unit is increased by taking advantage of the added volume of the fixed body, which is integral therewith.

If the epicyclic reduction gear unit were simply coupled externally to the homogenizer (and not integral therewith) it would not give such advantages and would probably not be preferable to a common parallel axis reduction gear unit.

The adoption of an epicyclic reduction gear unit in place of a traditional parallel axis reduction gear unit advantageously allows reducing the overall machine dimensions, obtaining high transmission ratios unlikely to be reached with other types of reduction gear units of equal dimensions, and optimizing the load distribution, there always being three pairs of gears engaged.

The application of an epicyclic reduction gear unit to a high-pressure homogenizer is certainly not obvious because the epicyclic reduction gear unit, precisely because of its compact dimensions, could give rise to difficulties in the dissipation of thermal power in particular working conditions. Thus a person skilled in the art would not be led to adopt such a solution.

The Applicant, however, has brilliantly solved this possible technical problem by creating an additional feeding of oil to the journal bearing of the reduction gear unit, added to which there are the advantages of constructing the reduction gear unit integrated into the transmission body.

The main advantages of using an epicyclic reduction gear unit instead of a parallel axis reduction gear unit are a reduction in overall dimensions, weight, costs and bending stress on the shaft (shorter shaft) as well as the absence of axial stress. The epicyclic reduction gear unit has an input and output shaft that are coaxial and not offset as in the parallel axis reduction gear unit.

The main advantages of an epicyclic reduction gear unit compared to the simple use of belts and pulleys consist in the reduction in overall dimensions and in assembly times (due to the absence of additional bearings).

It should also be taken into account that if solely a belt/pulley reduction system were used, there would be difficulties in using V belts on pulleys with diameters differing greatly from each other.

Finally, compared to the solution illustrated in WO 2008/044253, integrating the epicyclic reduction gear unit into the fixed body avoids the necessity of using an adaptor flange.

The invention claimed is:
1. A high-pressure homogenizer comprising:
  a fixed body (7) housing a rotating crankshaft (10) in a transmission chamber;
  a motor (3) for driving the crankshaft (10);
  a reduction gear unit (4) interconnected between transmission means (5, 6), and the crankshaft (10),
wherein the reduction gear unit (4) is an epicyclic reduction gear unit constructed integrally with the fixed body (7) and coupled with the homogenizer (1) in such a way as to comprise a single lubrication system common to the transmission means (5, 6) of the homogenizer (1) and to the reduction gear unit (4),
the crankshaft (10) defining an overhanging portion (10a), projecting relative to the fixed body (7), onto which overhanging portion the reduction gear unit (4) is keyed,
the gears of the reduction gear unit (4) being in a chamber of the reduction gear unit (4) communicating with the transmission chamber of the homogenizer.

2. The homogenizer according to claim 1, wherein there is provided a lubricant feed line (15) which links between the fixed body (7) to the epicyclic reduction gear unit (4).

3. The homogenizer according to claim 2, wherein the line (15) is configured so as to lubricate a journal bearing (17) of the epicyclic reduction gear unit (4).

4. The homogenizer according to claim 1, wherein the epicyclic reduction gear unit (4) comprises a sun gear (9) which compels three planet gears (11) to rotate inside a fixed toothed ring (12), the planet gears (11) being supported by a planet gear carrier (13) which rotates at a slower speed than the sun gear (9).

5. The homogenizer according to claim 4, wherein the planet gear carrier (13) is keyed onto a portion (10*a*) of the crankshaft (10), whereas the sun gear (9) is keyed onto a high-speed input shaft (14) solidly constrained with a pulley (6), which is part of the transmission means and it is driven by the motor (3) via belts (5).

6. The homogenizer according to claim 1, wherein the transmission means (5, 6) comprise a pulley (6) configured so as to enclose an outer casing (16) of the epicyclic reduction gear unit (4).

\* \* \* \* \*

UNITED STATES PATENT AND TRADEMARK OFFICE
CERTIFICATE OF CORRECTION

| | | |
|---|---|---|
| PATENT NO. | : 8,979,696 B2 | Page 1 of 1 |
| APPLICATION NO. | : 13/395002 | |
| DATED | : March 17, 2015 | |
| INVENTOR(S) | : Luca Salvarani et al. | |

It is certified that error appears in the above-identified patent and that said Letters Patent is hereby corrected as shown below:

Title page

Item (73) Assignee: Please delete "Mechnical" and insert therefor --Mechanical--.

Signed and Sealed this
Twenty-second Day of September, 2015

Michelle K. Lee
*Director of the United States Patent and Trademark Office*